J. W. SYKES.

HOLDER FOR NURSERY BOTTLES.

No. 11,665. Reissued May 17, 1898.

WITNESSES.

William E. Boyer.

C. Lukan

INVENTOR.

Joshua W. Sykes, by D. W. Bradford

Attorney.

UNITED STATES PATENT OFFICE.

JOSHUA W. SYKES, OF DETROIT, MICHIGAN.

HOLDER FOR NURSERY-BOTTLES.

SPECIFICATION forming part of Reissued Letters Patent No. 11,665, dated May 17, 1898.

Original No. 580,837, dated April 13, 1897. Application for reissue filed August 9, 1897. Serial No. 647,662.

*To all whom it may concern:*

Be it known that I, JOSHUA W. SYKES, a citizen of the United States, residing at Detroit, in the county of Wayne and State of Michigan, have invented certain new and useful Improvements in Holders for Nursery-Bottles; and I do hereby declare the following to be a full, clear, and exact description of the invention, such as will enable others skilled in the art to which it appertains to make and use the same, reference being had to the accompanying drawings, forming a part of this specification.

This invention relates to a case or holder for nursing-bottles; and it consists in the construction and arrangement of parts, as hereinafter fully set forth, and pointed out particularly in the claims.

The object of the invention is to provide a case in which a nursing-bottle may be inclosed and locked, a supporting-arm, and means for flexibly holding the bottle conveniently within reach of a child or infant when placed in a bed, cradle, or carriage to which the supporting-arm is attached, so that said bottle may be reached and used as desired and when released will be carried away and maintained in an upright position, which object is attained by the construction illustrated in the accompanying drawings, in which—

Figure 1:
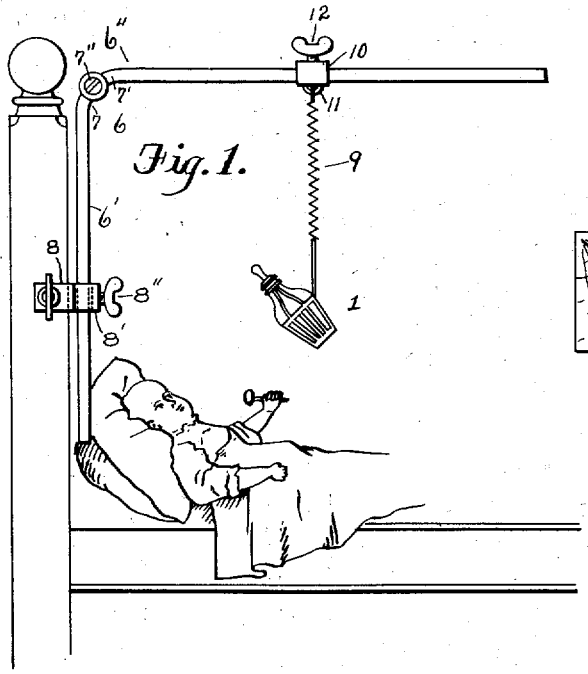
Figure 3:
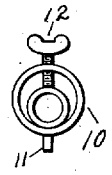
Figure 4:
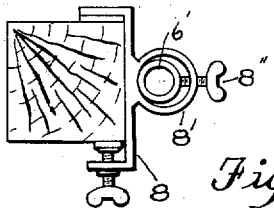
Figure 2:
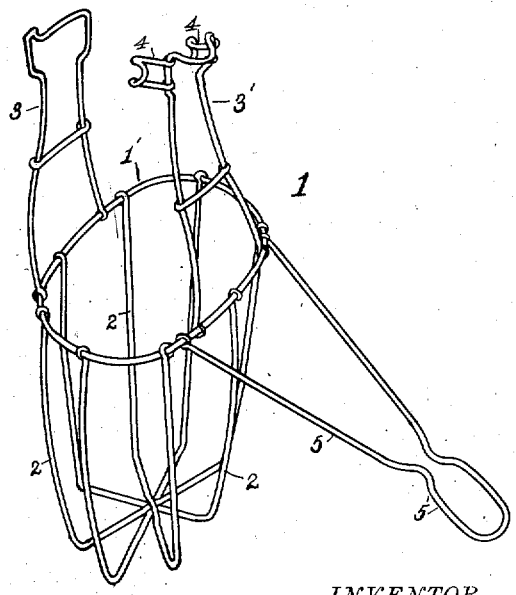

Figure 1 is a side elevation of a portion of a bed, showing the attachment of my supporting device to one of the head-posts thereof and the nursing-bottle suspended therefrom by a coiled-wire spring. Fig. 2 is an enlarged perspective view of the case in which the bottle is to be supported and locked, and Figs. 3 and 4 are enlarged details of the clamps for securing the supporting-arm to a bedpost or other object and for adjusting the position of the bottle along the supporting-arm.

Referring to the figures of reference, 1 designates a bottle-case, which is composed of an encircling band 1′, having the bails 2 depending therefrom and crossing at their centers to form a basket in which a bottle may be seated.

3 and 3′ represent arms formed of suitable wire, which are pivoted at their lower ends to band 1′ and extend upward therefrom. The upper end of the arm 3′ is provided with suitable hooks 4, which are adapted to be engaged in the upper sides of arm 3 when a bottle has been located in the basket therebeneath, as shown in Fig. 1, to securely hold said bottle therein, as will be understood.

5 indicates a hanger which is pivoted to the side of the bail and provided with an eye 5′.

6 designates a bracket of any suitable material and is composed of the two parts 6′ 6″, normally held at right angles to each other and having their ends 7 and 7′ pivotally united by means of the screw 7″, arranged to secure the parts at any desired angle.

8 indicates a padded clamp having a set-screw therein by which it is secured to the bed-frame or any other suitable support, and formed integral with this clamp is the sleeve 8′, so constructed as to receive loosely within it the standard or vertical part of the bracket 6′, where it is held by means of the set-screw 8″. This construction enables the bracket to be adjusted vertically and secured at any desired position.

9 designates a flexible support, preferably a light coiled spring, at the lower end of which the bottle-case is carried. This support is suspended at its upper end from the horizontal arm 6′ of the bracket and may be secured in any way desired. I prefer, however, to provide the sleeve 10, adjustably mounted upon said arm, with the eye 11 upon its under side to receive the flexible support and the set-screw 12 through its upper side to engage the arm and hold the sleeve in its adjusted position.

The operation of the device is as follows: When the nursing-bottle has been filled, the nipple is secured upon the neck thereof and said bottle placed within the basket of the case and locked therein in the manner set forth and the elevation of the arm 10 adjusted so as to support the bottle at the desired height, when the collar 11 may be moved along to bring the bottle depending therebeneath into easy reach of the infant. It will also be seen that if the desired position cannot thus be attained the set-screw 8″ may be loosened and the arm 10 swung around in the direction of a horizontal circle.

The bottom of the basket is made deep enough to cause the bottle to be normally maintained in an upright position when not in use, as shown in Fig. 1.

In the use of this holder the infant, reaching in the direction of the bottle, grasps it by the neck, and places the nipple in its mouth. It will be allowed to drink therefrom as long as desired. When the amount wanted has been secured, the bottle may be released, when it will be carried up out of the way. In case the infant should go to sleep while using the bottle contained in this improved holder and release its hold thereof said bottle will be carried away therefrom and maintained in an upright position and not allowed to lie in the bed to be lain upon nor to have the contents soak into the clothing.

It will also be understood that the bottle-case and hanger 5 may be removed from the lower end of the coiled-wire spring 13 and a toy or other suitable article suspended therefrom for the purpose of amusement, as will be readily understood.

Having thus fully described my invention, what I claim as new, and desire to secure by Letters Patent, is—

1. As a new article of manufacture, a bottle-case consisting of an encircling band, the bails depending therefrom, the arms pivoted thereto and extending upward, means for locking the upper ends of said arms about the neck of the bottle when said bottle is supported by said bails, and the hanger pivoted to said encircling band, for the purpose set forth.

2. In a holder for nursery-bottles, the combination of the bracket 6 composed of the upright portion 6′ and the horizontal portion 6″, the clamp 8, provided with set-screws to engage with the bedpost and to adjustably support the vertical portion of said bracket, the sleeve 10 provided with the set-screw 12 adjustably mounted upon the horizontal portion of said bracket, the flexible support 9 having its upper end secured to said adjustable sleeve, from which it is suspended, the bottle-case 1 consisting of the circular band, bails depending therefrom, and arms pivoted thereto and extending upward, means for locking the upper ends of the arms about the neck of the bottle, and a hanger pivoted to the circular band adapted to be secured to the lower end of said flexible support, whereby said bottle is returned to an upright position when released, substantially as described.

JOSHUA W. SYKES.

Witnesses:
F. J. PEDDIE,
FRANK AVERY.